United States Patent [19]

Stone et al.

[11] 3,727,633
[45] Apr. 17, 1973

[54] TAMPER-PROOF SOLENOID OPERATED VALVE

[75] Inventors: Allan U. Stone, Port Washington; Francis J. Martin, Huntington, both of N.Y.

[73] Assignee: Safetech, Inc., Fairfield, N.J.

[22] Filed: July 22, 1971

[21] Appl. No.: 165,264

[52] U.S. Cl. ......................137/382, 151/2, 151/24, 285/92, 137/552.5
[51] Int. Cl..............................................F16k 35/08
[58] Field of Search .....................151/2, 24; 251/139, 251/141; 137/382, 552.5; 285/90, 92

[56] References Cited

UNITED STATES PATENTS

| | | | |
|---|---|---|---|
| 2,881,980 | 4/1959 | Beck et al. | 251/141 X |
| 1,253,958 | 1/1918 | Godwin et al. | 151/24 |
| 2,703,720 | 3/1955 | Warren | 285/90 |

FOREIGN PATENTS OR APPLICATIONS

| | | | |
|---|---|---|---|
| 880,131 | 10/1961 | Great Britain | 251/139 |

Primary Examiner—Henry T. Klinksiek
Attorney—Norman N. Holland

[57] ABSTRACT

The invention is a solenoid operated valve for use in a vehicle fuel line or any other conduit where it is desired that the valve may be operated only by electric input signals and may not be removed from the line by unauthorized persons or otherwise tampered with. The valve stem is a plunger operated by a surrounding solenoid. The solenoid is adapted for being coupled to a source of power by a tamper-proof cable including terminals concealed in a flowed-in packing material. The valve has a metal protective outer casing which freely rotates on the controlled conduit thereby preventing it from being removed. Removal of the valve from the conduit may be performed by a predetermined arrangement of adjustable portions of the coupling thread which connects the outer metal protective casing to the remainder of the valve. These separate adjustable portions of the thread include a key-receiving means and indexing numbers so that a predetermined code may be used to align the threads to permit the removal of the protective casing.

3 Claims, 9 Drawing Figures

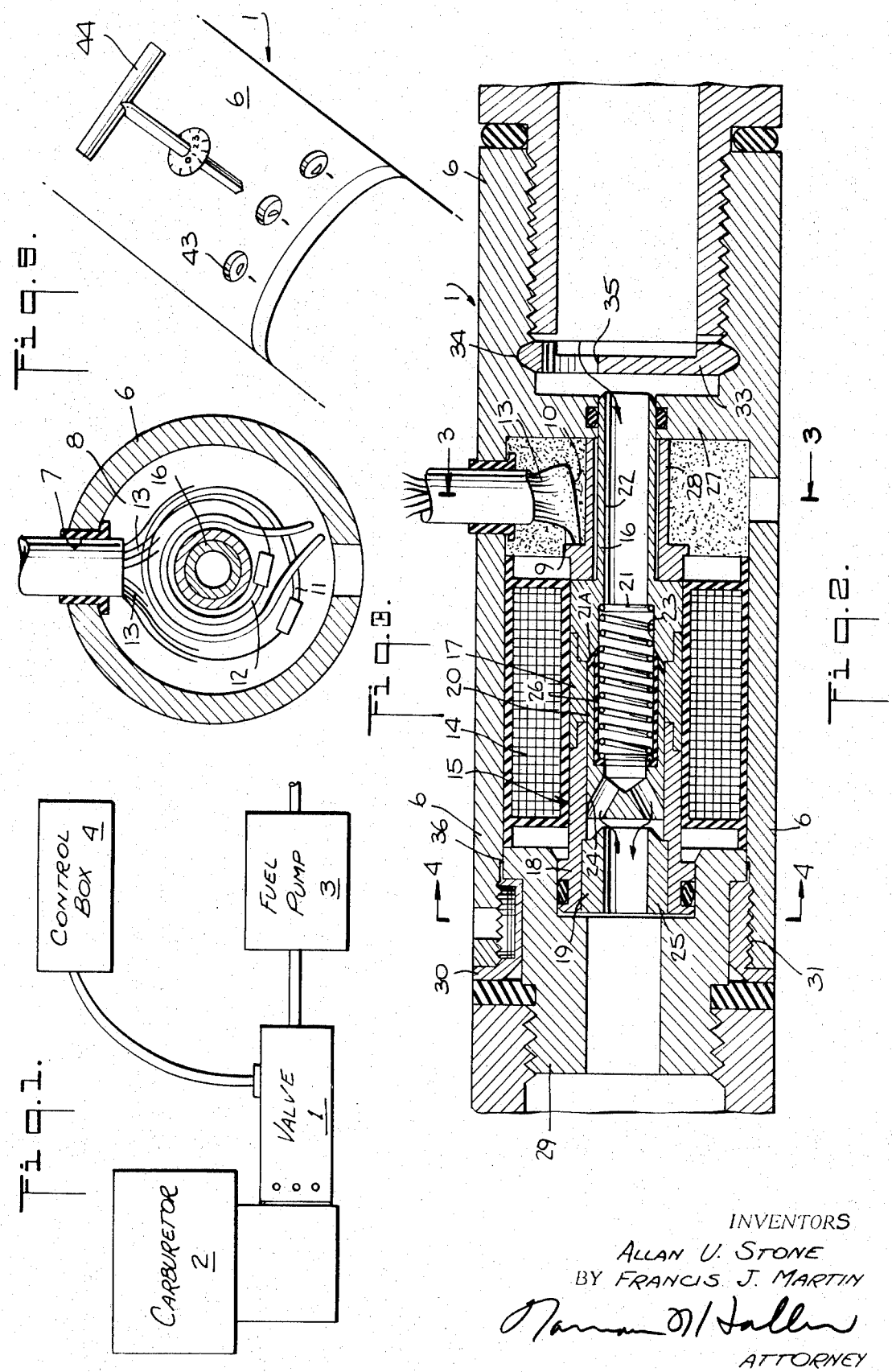

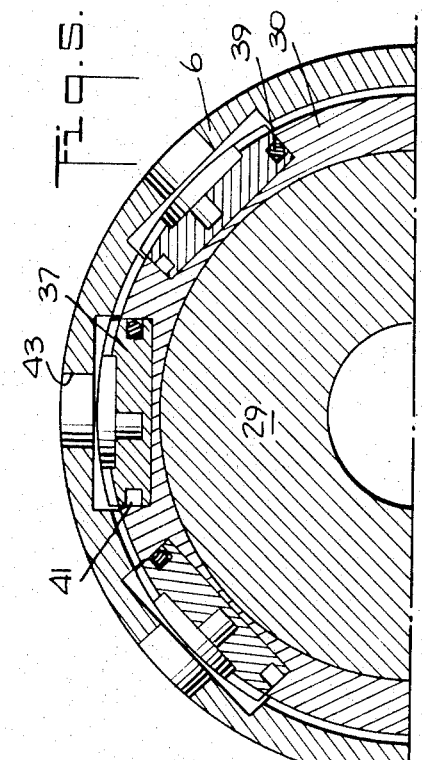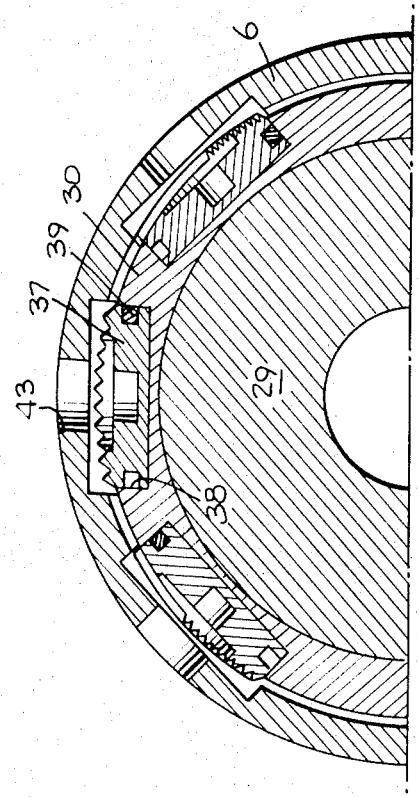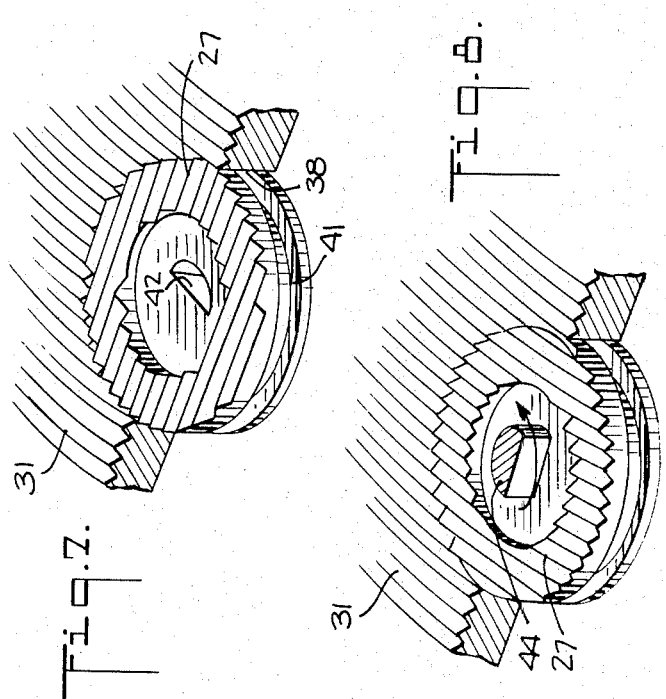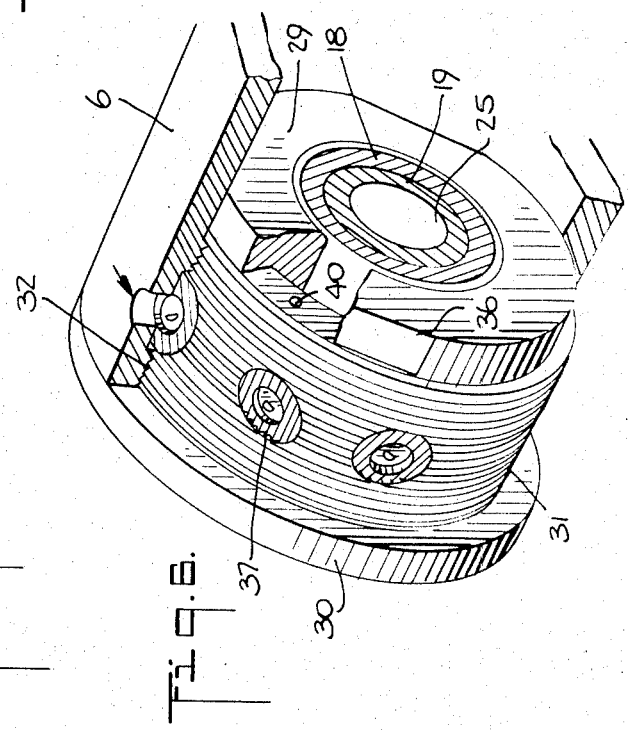

TAMPER-PROOF SOLENOID OPERATED VALVE

BACKGROUND OF THE INVENTION

The present invention relates to a tamper-proof valve and, more particularly, to a remotely controlled valve for a fluid line such as the fuel line for a motor vehicle. The valve, in accordance with the present invention, is made mechanically secure so that it may not be removed or operated independently of a protected electrical control system. This permits the vehicle to be protected against unauthorized use as the valve is arranged to remain closed and to be inoperative in any way except through the input of an electrical signal by a code operated electric control system.

The increasing number of thefts of motor operated vehicles including automobiles and boats has produced a need for a reliable locking system whereby the vehicles may only be operated by persons with knowledge of a predetermined code such as a four or five digit code. In addition to requiring a particular code input, these protective systems must themselves be completely tamper-proof so that a thief cannot electrically or physically by-pass it. One system which has been developed for protecting vehicles includes the insertion of a valve in the fuel feed line as, for example, a valve placed at the carburetor input in an automobile. Fully tamper-proof electrical systems have been devised for feeding the necessary electrical power into such a valve. However, the electrical portion of this valve itself as well as its mechanical structure and its attachment to the carburetor must also be fully tamper-proof.

The valve of the present invention provides these needed characteristics in a rugged, relatively simple and relatively easily produced tamper-proof valve. The valve includes an electric input terminal which cannot be identified and used and a plunger which cannot be operated independently of the electric control circuit by unauthorized persons. The physical structure of the valve itself, including a metal outer protective jacket, is arranged so that the valve may not be disconnected from the carburetor or other mounting and also so that it cannot be removed to permit access to the interior of the valve except by authorized persons.

Accordingly, an object of the present invention is to provide an improved electrically operated and tamper-proof control valve.

Another object of the present invention is to provide an improved tamper-proof control valve having a mechanically operated and coded means for permitting valve removal by authorized persons.

Another object of the present invention is to provide an improved means for locking threaded members together including a coded release means.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing, forming a part of the specification, wherein:

FIG. 1 is a diagrammatic illustration of a typical vehicle control system employing a valve in accordance with the invention.

FIG. 2 is a vertical sectional view of the tamper-proof valve in accordance with the present invention.

FIG. 3 is a vertical sectional view of the valve taken along line 3—3 on FIG. 2.

FIG. 4 is an enlarged vertical sectional view of the thread-locking portion of the valve taken along line 4—4 of FIG. 2.

FIG. 5 is a vertical sectional view similar to FIG. 4 showing a thread-locking means in its "open" or "release" position.

FIG. 6 is a detailed perspective view of the thread-locking means.

FIGS. 7 and 8 are enlarged detailed perspective views of the thread-locking members in their locked and unlocked positions, respectively.

FIG. 9 is a perspective view illustrating the use of the coded key for releasing the thread-locking means.

DESCRIPTION OF THE PREFERRED EMBODIMENT

The tamper-proof valve will first be described generally with particular reference to FIGS. 1 and 2.

As already indicated, the valve of the invention is for use in controlling systems where it is desired to make the valve operation completely safe against any type of tampering or unauthorized use.

FIG. 1 illustrates a typical use for the improved valve 1 in controlling an internal combustion engine. FIG. 1 shows a vehicle carburetor 2 coupled to a source of fuel through a fuel pump 3 and through the valve 1 of the invention. The valve 1 is preferably controlled by an electrical control box 4 which is coupled to the valve 1 through a tamper-proof electrical cable 5. The electrical control box 4 may be one of a variety of electrical or electronic devices where a predetermined push button or keyed or other coded input is inserted to provide an electric control signal output through the cable 5 to the valve 1. This control box 4 and the cable 5 are themselves tamper-proof and the valve 1 of the invention includes a tamper-proof terminal means in the valve body 6 (FIG. 2) for the cable 5 (FIG. 1) which will now be described with particular reference to FIGS. 2 and 3.

The tamper-proof cable 5 no matter what form it takes, will include one or two operative wires which may be relatively fine and which enter into the valve 1 through an inlet 7 into a cable receiving chamber 8 in the valve body 6. These control wires together with a number (which is usually a large number) of dummy wires are fed into the chamber 8 with the active wires 9 and 10 being attached to opposite ends 11 and 12 of the wires forming the plunger operating solenoid 14. After the cable wires 9 and 10 have been connected, as illustrated in FIG. 3, the entire chamber 8 is filled with a relatively hard flowed-in plastic material which completely imbeds and conceals the control wires 9 and 10 together with the various dummy wires 13 and coil ends 11 and 12 making the detection or pick-up of the wires at this point virtually impossible even if the thief were able to penetrate the hardened steel outer valve body 6.

The outer valve body 6 is provided not only to protect the electrical terminals but also to prevent any other entry into the valve 1 by cutting or drilling or disassembly so that mechanical manipulation of the valve stem is impossible.

The valve 1 includes a valve assembly 15 mounted within the outer valve body 6 and formed of three adjacent sections comprising an outer end 16, a magnetically insulating nonferrous center portion 17, and an inner end 18 having a cylindrical seat 19 inserted in its end. A generally cylindrical stem or plunger 20 is slidably fitted in the valve assembly for motion between an open position as illustrated in FIG. 2 and a closed position when it is moved to the left against the seat 19 under the force of a coil spring 21. In its open position, the plunger 20 rests against a circular abutting surface $21^4$ provided in the outer end 16 of the valve assembly 15. The controlled liquid passes through an inner conduit 22 in the valve assembly 15, a connecting conduit 23 in the plunger 20 and then through diverging ports 24 at the inner end of the plunger 20. In the open position, the liquid passes around the inner edges of these ports 24 and through a connecting port 25 in the valve seat 19.

The plunger is forced towards its closed position by the compressed coil spring 21 positioned between the plunger 20 and the outer end 16 of the valve assembly 15. A generally cylindrical nonmagnetic insulator 26 is preferably positioned between the plunger 20 and the spring 21 so that its end spaces the plunger 20 slightly from the outer end 16 of valve assembly 15 when the valve is open. This inner plunger 20 and valve assembly 15 are mounted in a connecting and protective outer structure which permits the valve to be mounted in the fuel system and which thereafter prevents removal or entry into the valve by unauthorized persons. The outer structure comprises the hollow and generally cylindrical valve body 6 which is preferably formed of hardened steel. This valve body includes an integral divider 27 which supports and seals the outer end of the valve assembly 15 and which in combination with a spacer 28, an outlet fitting 29, and an outer locking ring 30 holds the cylindrical electric solenoid 14 in place around the valve assembly 15.

The inner portions of the valve 1 including the valve assembly 15 with its valve plunger 20 and seat 19 and other members in position is inserted into the hollow outer body 6 with the spacer 28 supporting and spacing the inner end of the valve assembly 15. This combination is now locked in place by insertion of the threaded locking ring 30 whose exterior threads 31 engage corresponding interior threads 32 on the inner surface of the valve body 6. Once the locking ring 30 has been screwed into place, it holds the above described assembly together as a unit. A hardened baffle plate 33 is inserted in the outer end of the valve body 6 in a slot 34 or threaded and locked into place. This plate has an offset orifice 35 for the fuel to prevent access through the body to the plunger 20.

The valve body 6 together with the locking ring 30 which is attached to it freely rotate around the outlet fitting 29 so that the fitting 29 may not be unscrewed from the carburetor or other element to which it has been attached. In order to fit a wrench onto the outlet fitting end 36 to remove it from the carburetor 2, it is necessary to first remove the outer body 6 by unscrewing the locking ring 30. A coded locking device, which will now be described in detail with particular reference to FIGS. 4 through 8, is provided to prevent an unauthorized person from disconnecting the locking ring 30 from the valve body 6.

The valve body 6, as described above, is threadedly connected to the locking ring 30. This threaded coupling includes the locking device illustrated in FIGS. 4 through 8. The inner surface of the valve body 6 has regular ring engaging threads 32. The outwardly facing surface of the locking ring 30 is provided with matching threads 31 which engage the threads 32 of the valve body 6. Three circular sections of the threads 31 are separately formed on rotatably mounted tumblers 37. Each of these tumblers 37, as illustrated in FIGS. 4 and 5, are rotatably contained in circular slots 38 in the surface of the locking ring 30. The tumblers 37 are held in place by locking pins 39 inserted in pin holes 40 in the ring 30 so that each pin 39 engages a circular groove 41 in a tumbler 37.

Each of the tumblers 37 has a key engaging means such as an asymmetrical recess such as a half round recess 42 which is positioned below an aperture 43 in the valve body 6. In order to unscrew the body 6 from the locking ring 30, it is necessary to properly align all of the several locking tumblers 37. This may be done by the insertion of a key 44 (FIG. 9) into each tumbler 37 and by rotating the indexed key to cause each tumbler 37 to be turned to a predetermined position, as illustrated in FIG. 8. Since a number of the tumblers 37 are provided, it is clear that it will be impossible for an unauthorized person to properly align all the tumblers 37 in any reasonable time and it would therefore be impossible for a thief to remove the valve body 6 to open or to otherwise actuate the valve 1.

An improved tamper-proof liquid control valve has been provided. The valve is physically secure against any attempt by unauthorized persons to operate it other than in its designed manner through its electrical input system. Means are provided, however, which permit the valve owner or another authorized person to disassemble the valve for inspection or repair. The improved valve is also relatively simple and rugged so that it will operate in a reliable manner over an indefinite period as well as being relatively inexpensive to manufacture.

As various changes may be made in the form, construction and arrangement of the parts herein without departing from the spirit and scope of the invention and without sacrificing any of its advantages, all matter herein is to be interpreted as illustrative and not in a limiting sense.

Having thus described our invention, we claim:

1. An anti-theft fluid control valve for a fluid operated apparatus with a fluid inlet comprising the combination of a hollow valve body, a valve outlet fitting including first locking means attaching the valve body to the apparatus fluid inlet, a valve assembly positioned within said body, a flow control valve plunger movably mounted on said valve assembly, electrical means at least partially embedded in said body for moving said plunger, means concealing said first locking means comprising a locking ring covering said first locking means and having first interior threads engaging second threads on said valve body, and a plurality of rotatable tumblers positioned in said locking ring and each including a portion of the second threads whereby rotation of the tumblers misaligns said second thread portions with respect to the remaining portions of the second thread.

2. The valve as claimed in claim 1 in which said valve assembly comprises a generally cylindrical member having a cylindrical bore, said plunger comprising a generally cylindrical member slidably mounted in the bore, and said electrical stem moving means comprising an annular solenoid surrounding said valve assembly inwardly of said valve body.

3. The valve as claimed in claim 2 which further comprises a baffle plate within said hollow valve body having a fluid orifice positioned out of line with said bore in said valve assembly.

* * * * *